R. FANSLAU.
Machines for Cutting Food for Animals.
No. 135,326.
Patented Jan. 28, 1873.
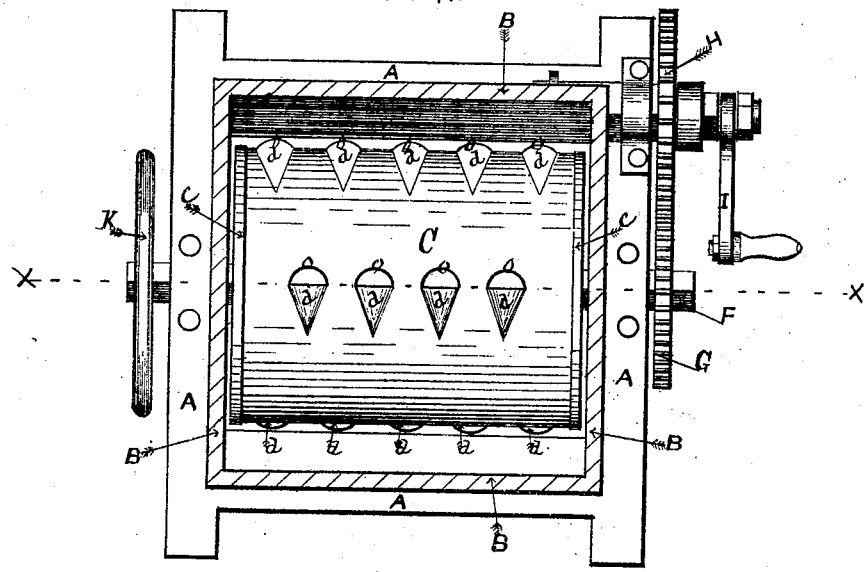
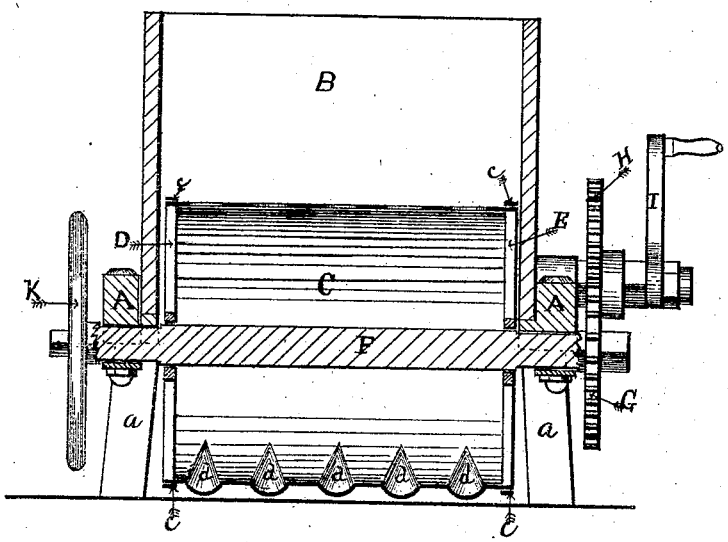

UNITED STATES PATENT OFFICE.

REINHOLD FANSLAU, OF NEW HAVEN, CONNECTICUT.

IMPROVEMENT IN MACHINES FOR CUTTING FOOD FOR ANIMALS.

Specification forming part of Letters Patent No. 135,326, dated January 28, 1873.

*To all whom it may concern:*

Be it known that I, REINHOLD FANSLAU, of the city of New Haven, State of Connecticut, have invented certain Improvements in Machines for Cutting Food for Animals, of which the following is a specification:

The object of my invention is to construct machines for cutting animal food which are cheap to build, easy to keep in repair, and not liable to get out of order.

Heretofore such machines, for which there is a large demand throughout the country, have been constructed in a complicated form, with knives or cutters bolted or screwed onto rotary rollers, which are costly and difficult to adjust.

Figure I is a plan view of a machine embodying my invention. Fig. II is a longitudinal cut section through line $x\ x$, Fig. I.

A is a frame with four legs, $a\ a\ a\ a$, to which is attached the box B. A cylinder, C, formed of sheet-iron or sheet-steel, is strengthened with the bands $c\ c$. In the cylinder C are pressed a number of projections, $d\ d\ d\ d$, which are formed by cutting half circles out of the sheet-iron or sheet-steel, and then placing the sheet under a die and press before it is made into a cylinder. Thus a number of cutters are formed in the cylinder, which are easily sharpened by simply holding a grindstone onto them when the cylinder revolves. These cutters $d\ o\ d\ o$ are placed in rows across the cylinder C, in such a manner that the cutters in one row will come in the periphery of the space between the cutters in another row, thus always presenting a cutter to the food placed in the box B to be operated on. To the axle F is attached a gearing-wheel, G, the teeth of which fall in between the teeth of the gearing-wheel H, which, by aid of the crank I, gives the rotary motion to the cylinder C. K is a fly-wheel attached to the axle F, for the purpose of giving a steady and continued rotary motion to the cylinder C.

It will be readily understood that animal food, placed in the box B, coming in contact with the cutters $d\ o\ d\ o$ of the rotating cylinder, will be cut in a very simple and efficient manner.

Having thus described my improved machine for cutting animal food, I desire to claim as my invention—

The sheet-iron cylinder C provided with the projecting cutters $d\ o\ d\ o$, formed by first cutting half-circle perforations in the sheet metal and then stamping upward the curved portions $d\ d$ of the cutters, so as to form an arch, diminishing as it recedes from the punctures $o$, in arrangement with the frame A and box B, when constructed and operated in the manner and for the purpose set forth.

REINHOLD FANSLAU.

Witnesses:
RICHARD GERNER,
A. C. CRONDAL.